March 12, 1957 V. J. HOLOPAINEN 2,784,768
REVERSIBLE SEAT

Filed June 1, 1954 2 Sheets-Sheet 1

INVENTOR.
Vaino J. Holopainen
BY
Norman J. Blodgett
Attorney

March 12, 1957  V. J. HOLOPAINEN  2,784,768
REVERSIBLE SEAT

Filed June 1, 1954  2 Sheets-Sheet 2

INVENTOR.
Vaino J. Holopainen

United States Patent Office 2,784,768
Patented Mar. 12, 1957

2,784,768
REVERSIBLE SEAT

Vaino J. Holopainen, Rutland, Mass., assignor to Wain-Roy Corporation, Hubbardston, Mass., a corporation of Massachusetts Application June 1, 1954, Serial No. 433,472

8 Claims. (Cl. 155—99)

This invention relates generally to a seat and more particularly to a convertible seating apparatus for use with a vehicle or the like.

There are many occasions when it would be desirable to have available a seating apparatus which would permit the occupant to face selectively in one of two opposite directions and which would also permit the occupant to be seated at different levels and at different spaced positions when facing in these directions. Such a seat would be desirable, for instance, for use with a tractor having a rearwardly-extending digging attachment; in this case, the occupant of the seat must face forwardly to drive the tractor. At the same time, the seat must be positioned properly in the up and down direction as well as the forward and back direction to permit the occupant to reach the steering wheel and foot pedals. When performing the digging operation, however, the occupant must face rearwardly and the seat must occupy vertical and horizontal positions which may be considerably removed from the corresponding positions which it occupies when facing in the forward direction. The vertical and horizontal positions occupied by the seat when facing rearwardly are, of course, determined by the position of the controls of the digging attachment. None of the seats of the prior art have provided these features or other features which have been found to be necessary to a seating apparatus of this type. The shortcomings of previously-known devices are obviated by the present invention.

It is therefore an outstanding object of the invention to provide a seat capable of facing selectively in one of two opposite directions, the portion contacted by the occupant being situated in one of two vertical and horizontal positions.

Another object of the present invention is the provision of a seat that may be rapidly changed from a first position to a second position in which the occupant faces in the direction opposite to and in vertical and horizontal positions substantially removed from the first position.

A still further object of the instant invention is the provision of a seat having a novel construction which will permit the occupant to face in one of two opposed directions.

It is another object of the invention to provide a seat for a tractor having a digging attachment wherein the seat is capable of facing forwardly in a position enabling the occupant to operate the steering wheel and foot pedals of the tractor and is further capable of being rapidly and effectively moved to a rearwardly-facing position at which position the occupant is situated vertically and horizontally to operate the controls of the digging attachment.

With these and other objects in view, as will be apparent to those skilled in the art, the invention resides in the combination of parts set forth in the specification and covered by the claims appended hereto.

The character of the invention, however, may be best understood by reference to certain of its structural forms, as illustrated by the accompanying drawings in which.

Like reference characters denote similar parts in the several figures of the drawings.

Figure 1:
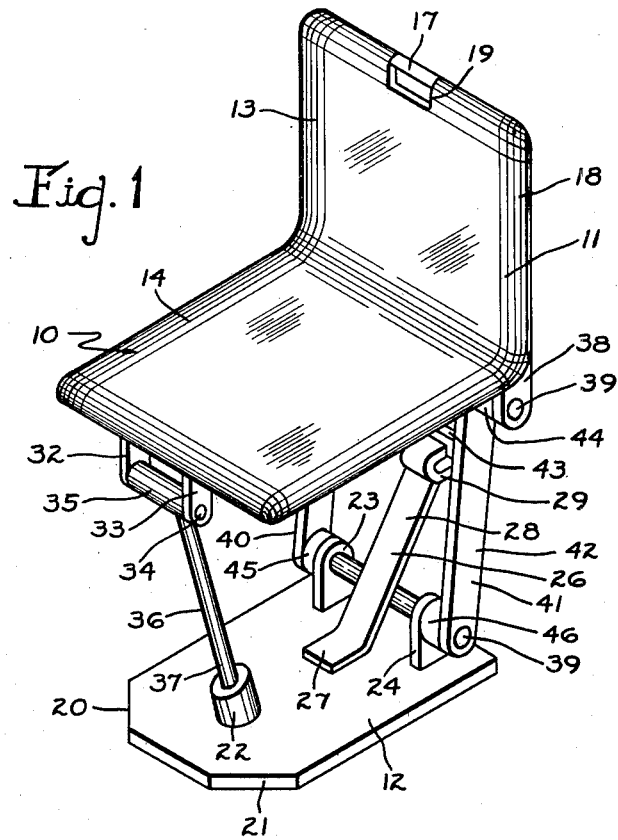
Figure 1 is a perspective view of the seat of the invention.
Figure 2:
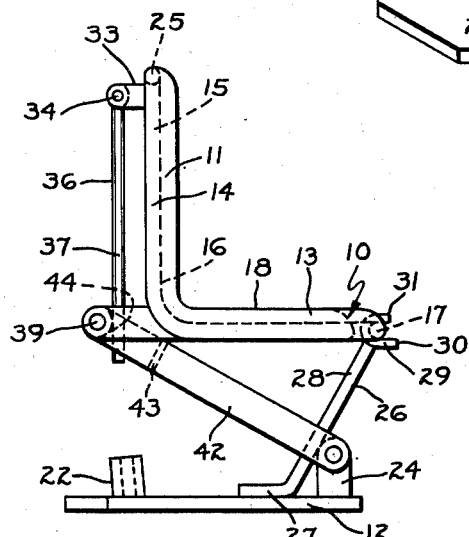
Figure 2 is a side elevational view of invention.

Referring first to Figure 1, wherein is best shown the broad features of the invention, the seat, designated generally by the reference numeral 10, is shown as comprising a seating portion 11 held in vertically-spaced relationship to a base 12. The portion 11 consists of a first part 13 and a second part 14 fixedly held at a right angle. As is evident from Figure 2, the seating portion is defined by a framework 15 formed of pieces of metallic tubing which have been bent and welded together to form two parallel L-shaped sections 16, joined by straight parallel sections 17 and 25. The framework 15 is provided with upholstery 18 in the usual manner. The upholstery 18 is not shown in detail but would consist, as is the usual case, in stiff board overlying the framework followed by a layer of padding material and then a cover of plastic sheet or leather covering the framework, board and padding material. The plastic sheet or leather holds the board and padding material to the frame in the usual way by being wrapped around the frame and fastened to the underside of the board by staples or the like. An elongated aperture 19 is provided in the upholstery exposing a portion of the section 17 of the framework 15.

The base 12 is formed of plate metal and, in the preferred embodiment, is generally rectangular with two beveled corners 20 and 21 formed at one end which, for the sake of definition, is called the rearward end. At the end of the base adjacent the beveled corners is fastened, by welding or otherwise, a socket such as a short tubular abutment 22. The axis of this abutment lies in a vertical plane running lengthwise and centrally of the base, but is inclined rearwardly and upwardly in that plane. At the forward end of the base are fastened two hinge blocks 23 and 24; these blocks are of generally rectangular plate-like conformation aligned transversely of the base and spaced equal distances from the centerline. Fastened to the base along the centerline in a position spaced rearwardly of the hinge blocks 23 and 24 is a brace 26. The brace comprises a short horizontal portion 27 from which extends, at a forward angle of approximately 120 degrees, an elongated intermediate portion 28. To the top of the intermediate portion is welded a hook portion 29 consisting of a piece of strap metal bent to form a U having a lower leg 30 which is somewhat longer than its upper leg 31. As a matter of fact, the length of the upper leg 31 from its end to the bight of the hook portion is less than the width of the elongated aperture 19 in the seating member 11.

The portion 14 of the seating member is provided with two hinge elements 32 and 33 spaced on opposite sides of the center-line and extending downwardly when the apparatus of the invention is in the condition shown in Figure 1. A hinge pin 34 extends through the hinge elements and on this pin is mounted a ferrule 35 of a hinged leg 36. The leg 36 further consists of a rod portion 37, the free end of which is of a size capable of entering the tubular abutment 22. Welded to the L-shaped sections 16 at their apices and extending in the same direction as the hinge elements 32 and 33 are hinge elements 38. A short hinge pin 39 passes through each of these elements and also passes through the upper end of one of the members 40 and 41 making up the leg 42. The leg members are of a strap-like configuration and are joined at an intermediate position by a brace 43. Tubular spacers 44 surround the hinge pin 39 and serve to maintain the upper ends of the leg members 40 and 41 in spaced relation to the hinge elements 38 and 39, respectively. In a similar manner, tubular spacers 45 and 46 surround the hinge pin 39 and serve to hold the lower ends of the members 40 and 41 in spaced relation to the hinge elements 23 and 24. In the preferred embodiment, the seat in its rearwardly-facing position is considerably higher than in its forwardly-facing position and the leg 42 is long enough so that the upper portion of the brace 26 underlies and does not strike the brace 43 in any position of the seat. If the converse in the relative heights of the positions of the seat were desired, the seat could, of course, be turned 180 degrees about a vertical axis.

Figure 4:
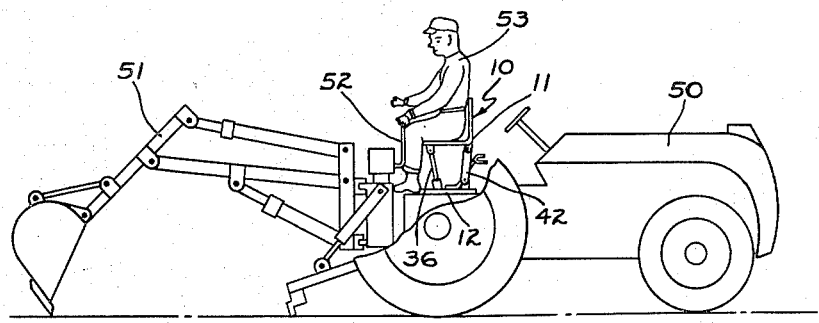
Figure 4 is a side view of a tractor with a digging attachment showing the invention in use with occupant operating the digging attachment.
Figure 5:
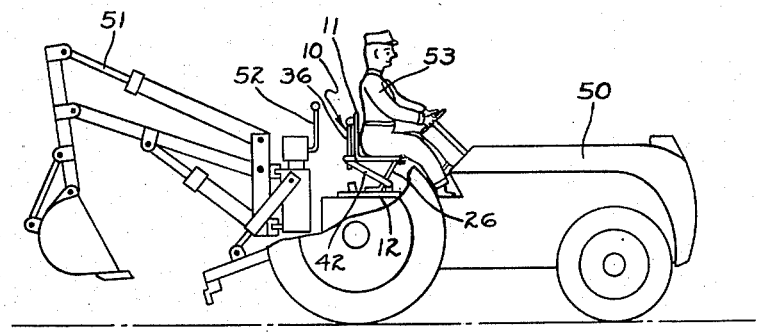
Figure 5 is a side view of the tractor and attachment, but showing the occupant using the invention to face forwardly to operate the tractor.

The operation of the invention will now be clearly understood in view of the above description. Referring to Figures 4 and 5, the seat 10 is shown mounted in the usual position on a tractor 50 having attached to the rearward end thereof a hydraulic digging attachment 51 having controls 52. In Figure 4 the seat is in the condition shown in Figure 1. The occupant 53 is facing rearwardly and is operating the digging attachment by means of the controls 52. The tractor is, of course, at a standstill. In this position the occupant is seated on the part 14 of the seating portion 11. The leg 42 is in a substantially vertical position and the lower end of the leg 36 resides in the tubular abutment 22. The interengagement of the leg 36 with the abutment 22 absorbs forces which would tend to move the seating portion in a horizontal direction. It is to be noted that the occupant 53 is in a high seating position and overlies the rearward end of the base, i. e., is close to the controls 52. Now, in moving the tractor and its attachment from place to place the occupant will wish to face forwardly. The seat is then changed to the condition shown in Figures 2 and 5. The digging attachment is raised into an inoperative position. The leg 36 is lifted out of the abutment 22, the leg 42 is moved into a rearwardly and upwardly inclined position, and the seating portion 11 is rotated about the axis represented by the hinge pins 39 until the part 13 takes a horizontal position. The part 13 moved downwardly so that the upper leg 31 of the hook portion 29 of the brace 26 moves through the aperture 19. Then the part 13 is moved rearwardly until the exposed portion of the tubular section 17 resides in the bight of the hook portion 29. The seat is now in a stable condition and may be used. The leg 36 now hangs uselessly, but unobtrusively at the rear of the seat. It should be noted that the occupant is now situated considerably lower than he was in the rearwardly-facing position; furthermore, he is adjacent the forward end of the base 12, i. e., closer to the steering wheel.

The proportions of the parts can be modified to obtain a desired relationship of heights and horizontal positions to suit particular circumstances.

Figure 3:
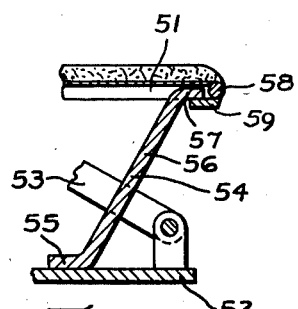
Figure 3 is a vertical sectional view of a portion of a modified form of the invention.

In Figure 3 is shown a slightly modified construction of the invention. The major change over the construction previously described is in the interconnection between the inclined brace and the seating portion. The seat comprises a seating portion 51 and a base 52 joined by a leg 53. A brace 54 is fastened to the base and extends upwardly and forwardly therefrom. The brace is formed from strap metal into a short horizontal portion 55 which is fastened to the base, an elongated inclined intermediate portion 56, and a short horizontal end portion 57. The seating portion 51 is formed with a transverse frame section 58 to the central portion of which is welded a plate 59. The frame section 58 and the plate 59 form a pocket to receive the end portion 57 of the brace 54 when the seat is in the condition similar to that shown of the previously-described embodiment in Figure 2, i. e., forwardly-facing.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A seat comprising a seating member having a first part and a second part fixedly joined at a right angle, a base, a leg hingedly connected at one end to one end of the base and hingedly connected at the other end to the member at the junction of the two parts, the seating member and the leg being selectively movable from a low position, wherein the seating member faces in one direction, the leg lies at a small angle to the horizontal, and the said first part is substantially horizontal, to a high position wherein the seating member faces in the opposite direction, the leg lies at a large angle to the horizontal, and the said second part is substantially horizontal, and means for maintaining the seat member fixedly in the selected low or high position.

2. A seat comprising a member having a first part and a second part fixedly joined at a right angle, a base, a first leg hingedly connected at one end to one end of the base and hingedly connected at the other end to the member at the junction of the two parts, the member and the first leg being selectively movable from a low position, wherein the member faces in one direction, the leg lies at a small angle to the horizontal, and the said first part is substantially horizontal, to a high position wherein the member faces in the opposite direction, the leg lies at a large angle to the horizontal, and the said second part is substantially horizontal, and a second leg hingedly attached to one of the parts at a point spaced from the said junction of the parts and connecting with the base in one of the said positions to maintain the said one part in parallel relation with the base.

3. A seat comprising a member having a first part and a second part fixedly joined at a right angle, a base, a leg hingedly connected at one end to one end of the base and hingedly connected at the other end to the member at the junction of the two parts, the member and the first leg being selectively movable from a low position, wherein the member faces in one direction, the leg lies at a small angle to the horizontal, and the said first part is substantially horizontal, to a high position wherein the member faces in the opposite direction, the leg lies at a large angle to the horizontal, and the said second part is substantially horizontal, and a brace fixed to the base and extending upwardly and having means to engage one of the parts at a point spaced from the said junction to maintain the said part in parallel relation with the base.

4. A seat comprising a seating member having a first part and a second part fixedly joined at a right angle, a base, a leg hingedly connected at one end to one end of the base and hingedly connected at the other end to the member at the junction of the two parts, the seating member and the leg being selectively movable from a low position, wherein the seating member faces in one direction, the leg lies at a small angle to the horizontal, and the said first part is substantially horizontal, to a high position wherein the seating member faces in the opposite direction, the leg lies at a large angle to the horizontal, and the said second part is substantially horizontal, and means for maintaining the seat member fixedly in the selected low or high position, a socket at the other end of the base, and a second leg hingedly connected at one end to the first part of the member at a point considerably removed from the said junction of the parts and fitting at its free end into the socket to retain the said first part of the member parallel to the base.

5. A seat comprising a member having a first part and a second part fixedly joined at a right angle, a base, a leg hingedly connected at one end to one end of the base and hingedly connected at the other end to the member at the junction of the two parts, the member and the first leg being selectively movable from a low position, wherein the member faces in one direction, the leg lies at a small angle to the horizontal, and the said first part is substantially horizontal, to a high position wherein the member faces in the opposite direction, the leg lies at a large angle to the horizontal, and the said second part is substantially horizontal, and a brace rigidly attached at one end to the base and having means at the other end engaging the second part of the seating member at a point considerably removed from the said junction, the brace serving to maintain the second part parallel to the base.

6. A seat comprising a seating member having a first part and a second part fixedly joined at a right angle, a base, a leg hingedly connected at one end to one end of the base and hingedly connected at the other end to the member at the junction of the two parts, a socket at the other end of the base, a leg hingedly connected at one end to the first part of the seating member at a point considerably removed from the said junction of the parts and fitting with its free end in the socket to retain the said first part of the member parallel to the base when the leg and socket are so engaged, and a brace rigidly attached at one end to the base and being formed at the other end with means to engage the second part of the seating member when swung through 90 degrees at a point considerably removed from the said junction, the brace serving to maintain the second part parallel to the base when the brace is so engaged therewith.

7. A seat comprising a member having a tubular metal frame and having a first part and a second part fixedly joined at a right angle, a base, a leg hingedly connected at one end to one end of the base and hingedly connected at the other end to the member at the junction of the two parts, the member and the first leg being selectively movable from a low position, wherein the member faces in one direction, the leg lies at a small angle to the horizontal, and the said first part is substantially horizontal, to a high position wherein the member faces in the opposite direction, the leg lies at a large angle to the horizontal, and the said second part is substantially horizontal, and a brace fixed to the base, extending upwardly, and having a forked end to engage the tubular frame of one of the parts at a point spaced from the said junction to maintain the said part in parallel relation with the base.

8. A seat comprising a member having a tubular frame and having a first part and a second part fixedly joined at a right angle, a base, a leg hingedly connected at the other end to the member at the junction of the two parts, the member and the first leg being selectively movable from a low position, wherein the member faces in one direction, the leg lies at a small angle to the horizontal, and the said first part is substantially horizontal, to a high position wherein the member faces in the opposite direction, the leg lies at a large angle to the horizontal, and the said second part is substantially horizontal, and a brace rigidly attached at one end to the base and having means at the other end engaging the tubular frame of the second part of the seating member at a point considerably removed from the said junction, the brace serving to maintain the second part parallel to the base, the second part of the member being formed with an aperture exposing a portion of the tubular frame for engagement by the brace.

References Cited in the file of this patent

UNITED STATES PATENTS

| | | |
|---|---|---|
| 2,583,410 | Burnett | Jan. 22, 1952 |

FOREIGN PATENTS

| | | |
|---|---|---|
| 7,326 | Great Britain | 1909 |
| 289,852 | Germany | Jan. 20, 1916 |